(No Model.) 7 Sheets—Sheet 1.

J. GARDNER.
TYPE WRITING MACHINE.

No. 463,859. Patented Nov. 24, 1891.

Witnesses
Inventor
John Gardner
By Geo. P. Whittlesey
Atty.

(No Model.) 7 Sheets—Sheet 2.

J. GARDNER.
TYPE WRITING MACHINE.

No. 463,859. Patented Nov. 24, 1891.

Witnesses

Inventor
John Gardner,
By Geo. F. Whittlesey
Atty.

(No Model.) 7 Sheets—Sheet 3.

J. GARDNER.
TYPE WRITING MACHINE.

No. 463,859. Patented Nov. 24, 1891.

Witnesses

Inventor
John Gardner,
By Geo. F. Whitelsey,
Atty.

(No Model.) 7 Sheets—Sheet 4.

J. GARDNER.
TYPE WRITING MACHINE.

No. 463,859. Patented Nov. 24, 1891.

(No Model.) 7 Sheets—Sheet 5.

J. GARDNER.
TYPE WRITING MACHINE.

No. 463,859. Patented Nov. 24, 1891.

(No Model.) 7 Sheets—Sheet 6.

J. GARDNER.
TYPE WRITING MACHINE.

No. 463,859. Patented Nov. 24, 1891.

Witnesses

Inventor
John Gardner,
By Geo. P. Whittlesey

UNITED STATES PATENT OFFICE.

JOHN GARDNER, OF MANCHESTER, ENGLAND.

TYPE-WRITING MACHINE.

SPECIFICATION forming part of Letters Patent No. 463,859, dated November 24, 1891.

Application filed March 7, 1890. Serial No. 343,017. (No model.) Patented in England May 27, 1889, No. 8,719.

*To all whom it may concern:*

Be it known that I, JOHN GARDNER, typewriter specialist, a citizen of the United Kingdom of Great Britain and Ireland, and a resident of Cross Street, Manchester, in the county of Lancaster, England, have invented certain new and useful Improvements in Type-Writing Machines, (patented in Great Britain May 27, 1889, No. 8,719,) of which the following is a specification.

This invention relates to type-writers, and has for its object to simplify the construction and to reduce the cost of such machine.

In a type-writer constructed according to these improvements the letters, figures, and other characters of which it is desired to obtain impressions when operating the typewriter are arranged and formed or secured upon the periphery or surface of a cylinder or segment of a cylinder, which is mounted upon a vertical shaft in such a manner that it is capable of vertical motion on the shaft, but is compelled to rotate with the shaft. Upon this shaft there is also fixed a pinion, which gears into a corresponding toothed rack or quadrant operated through a lever by the type-key stems. That part of the lever which is acted upon by the type-key stems is diagonal, stepped, or otherwise similarly formed, so that each type-key being equally depressed the lever will be depressed through a different distance by the action of each different key. Consequently, also, the type-cylinder will be rotated through different angles on the depression of different keys, and each key will upon being depressed bring the spot accorded to that key on the printing-surface into a definite position, which is the printing-point. To more effectually secure the steady and accurate position of each letter or character for printing, a light rod or finger is secured to the lower end of the cylinder-shaft and moves therewith. When the operating-keys are depressed, the lower ends of the key-stems or projections therefrom pass across the path of the light rod or finger, so that when the key is depressed the rod moves in a circular arc until it comes into contact with the key-stems, by which it is stopped just as the corresponding character on the cylinder comes into the position to be printed.

When the machine is constructed to print more than one set of characters—as, for example, the three sets consisting of capital letters, small letters, and numerals and points— each set of characters is arranged in two lines, and these two lines constitute one "field." In the example given, therefore, there would be three fields of characters, one below the other, and it becomes necessary to bring, first, the desired field, and, second, the desired line of that field, into the printing-plane. Normally the upper line of the field of characters is in the printing-plane, and this upper line will be printed without any other operation than depressing the proper type-key. When it is required to print a character which is in the second line of the field, a shift-key is depressed simultaneously with the type-key. The action of the shift-key is to lift the type cylinder or segment so far as to make the second line come into the printing-plane which the first line previously occupied. The second or the third field may be brought into the printing-plane by means of a lifter, which lifts the type-cylinder vertically along its spindle, so that in the second and third fields the upper line will be printed on depressing a type-key alone, and the second line by simultaneously operating the type-key and the shift-key, as described, for the first field. By means of this arrangement it is possible to print with three fields of characters six separate characters with each type-key. The characters are by preference inked by means of an inking pad or brush so placed that the characters come in contact with it and are thereby inked during the angular motion of the type-cylinder. An inking-ribbon may, however, be used if preferred. A shield having a hole therein just large enough to allow the paper to be brought into contact (by the blow of the impression-hammer) with one character only, is placed in front of the type-cylinder so that its hole is at the printing-point. A paper-carriage sliding and obtaining its motion in the usual or in any convenient manner, is placed at the back of the type-cylinder. Upon this paper-carriage there is mounted a roller having a guide or guides to press the paper into contact with the roller. The paper is coiled upon the roller for printing. The depression of the type-key releases a trigger which liberates a spring operating the impression-hammer, by means of which the impression is made on the paper. Spacing-dogs constructed as hereinafter described or in the usual or other convenient manner are geared with a rack fixed upon the paper-carriage to allow the paper to be fed forward longitudinally after each impression.

I will more particularly describe my invention with reference to the accompanying drawings, in which—

Figure 1 is a perspective view. Figs. 2 and 3 are elevations of alternative forms of the type-cylinder; Fig. 4, an elevation of the inking pad or brush; Fig. 4$^a$, an elevation of an alternative form of the hammer mechanism; Fig. 20 is an elevation.

In each of the figures similar parts where they are represented are indicated by similar letters of reference.

A A are the type-keys, the stems of which are preferably non-circular in cross-section and pass through holes having corresponding shapes in the plates B C. Each of the key-stems has a limb or extension D, which also passes through the plate C and a projection E, which comes in contact with the lever F when the keys are depressed. The lever F is preferably somewhat U-shaped in plan, and its upper surface or the part with which the projections E make contact is inclined or stepped, so that it is normally nearer to those projections E E at one end of the key-board than to those at the other end. If, therefore, the type-keys be depressed to an equal extent in action, the lever F will be depressed to a different extent for each key. Below the lever F there may be mounted a pin or friction bowl G on the arm G', connected to the spindle G$^2$, upon the other end of which there is mounted the segment of a toothed wheel H, gearing into the pinion (or segment of a pinion) H', screwed to the type-cylinder or segment I. From this construction and arrangement it will be evident that for the depression of each type-key the type-cylinder will be brought into a different angular position, and that a character corresponding to that on the depressed type-key will be brought to the printing-point.

Figures 1, 2, 3, 4, 4A:
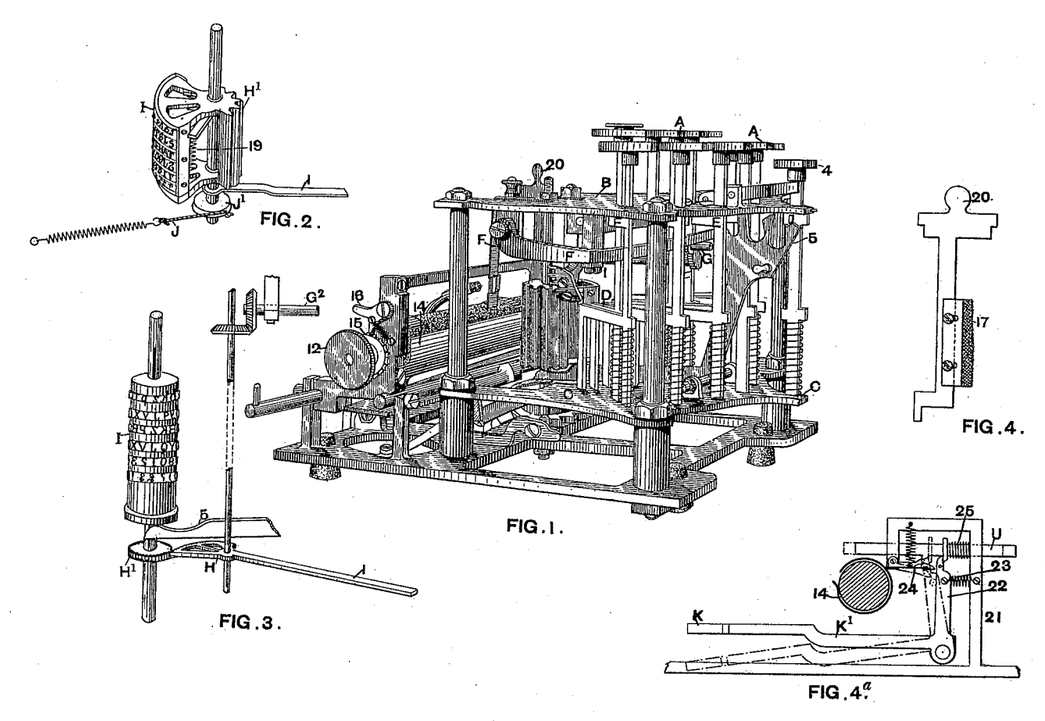

The type-cylinder or segment is preferred to be constructed as represented in Fig. 2, where the pinion by means of which it is rotated is cut in the material of which the cylinder or segment is made. The teeth of the pinion are of such a width and length as to insure the segment-wheel H being in gear therewith in any vertical position of the type-cylinder. The return of the type-cylinder to its normal position is secured by the action of a spring, which may be connected by a cord J to the small grooved pulley J', Fig. 2. If it is preferred to make the type-carrier cylindrical, an arrangement similar to that indicated in Fig. 3 may be adopted. In this case the cylinder is rotated by the quadrant H, gearing with H', which is fast on the type-cylinder shaft. This quadrant may have the required motion imparted to it by means of the small bevel-wheels shown in the figure, one of which is on the end of the vertical quadrant-shaft, and the other on the end of the shaft G$^2$, or it may be rotated by means of a suitable pinion on the quadrant-shaft gearing with the quadrant H.

Figure 6:
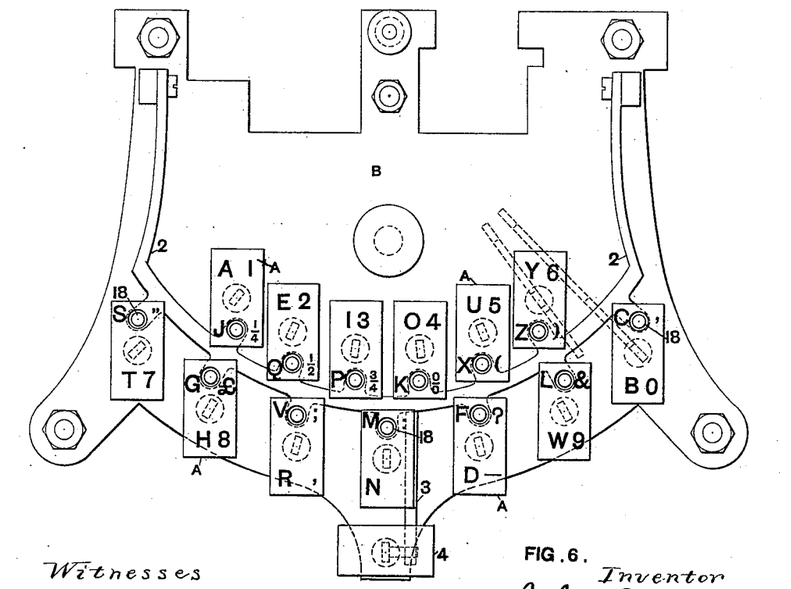
Fig. 6, a plan of Fig. 5.
Figure 9:
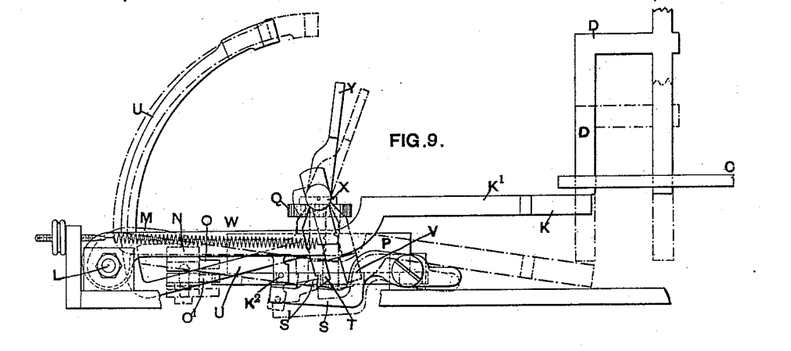
Fig. 9 is a transverse section of Fig. 10.
Figure 11:
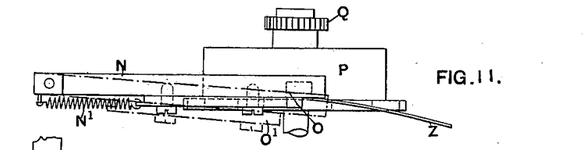
Figs. 11, 12, 13, 14, 15, and 16 are details.
Figure 12:
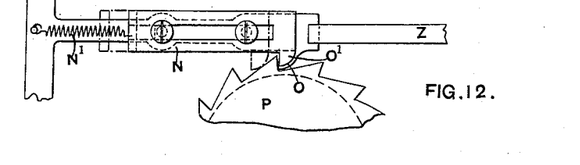
Figures 13, 14:
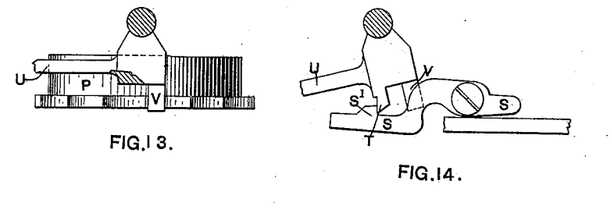

It will be understood that there are four characters engraved on each key, as represented in Fig. 6, when three fields of type are used. These four characters represent six characters on the type-cylinder. Thus, taking the key to the extreme left, the characters engraved on the keys are S " T 7. The corresponding characters on the extreme left of the type-cylinder are t s T S 7 ", the small and large letters on the type-cylinder being represented on the key by the large letter only. The t is in the first row and the s in the second row of the first field. The T is in the first row and the S in the second row of the second field, and the 7 is in the first row and the " in the second row of the third field, all these characters being on a vertical line. Both the limbs of the key-stems pass through the plate C. Of these the vertical limb simply acts as a guide. The inner limb D of each of the stems of the type-keys presses upon the quadrant K, formed on the end of the lever K', so that the depression of any of the type-keys compels the depression also of the lever K', Figs. 4$^a$, 9, 10, &c. This lever operates the impression-hammer and the paper-feed motion. It is fulcrumed on the spindle L, which has formed upon its farther end the projection M, bearing upon a lever N, on the under side of which are the two dogs O O'. Of these two dogs (which are more fully shown in Figs. 11 and 12) O is fast with the lever, and O' is carried on a sliding plate. When the machine is not being operated, both dogs are vertically one under the other, and O' is in engagement with one of the teeth of the escape-wheel P. So soon, however, as one of the type-keys is depressed the projection M pushes down the lever N, (dotted lines, Fig. 11,) and thus pushes the dog O' out of engagement with the tooth of the wheel P and at the same time brings the dog O into engagement with the same tooth. When the dog O' is thus freed, it is pulled backward by the spring N' in the position indicated by dotted lines, Figs. 9 and 12, where it is in a position to engage with the following tooth of P. As soon as the type-key is released the dog O rises out of engagement with the teeth of P, and the wheel is rotated by an internal spring until the next tooth catches the dog O', which is forced under the dog O or into the first position. Thus for every depression of a type-key the wheel P rotates through the space occupied by one tooth. The motion of P is communicated to the paper-carriage by a pinion Q, which engages with a rack secured to the paper-carriage, as in other machines of similar construction.

On the lever K' there is a pin or projection K², which comes in contact with and depresses the lever S, which carries a trigger S', engaging with a dog T on the impression-hammer lever U, Figs. 9, 10, 13, and 14. The lever S is pressed into contact with the pin or projection on the lever K' by a light spring. On the hammer-shaft there is a second dog or projection V, which engages with the teeth of the escape-wheel P. When the machine is at rest, the dog T (represented as broken off for the sake of clearness in Fig. 13) is held by the trigger on the lever S, so that the dog or projection V is out of contact with the teeth of the wheel P. On the depression of one of the type-keys the trigger is released and the hammer is pulled by the spring W, so as to make the impression. By this motion the second dog or projection on the hammer-lever is brought into contact with one of the teeth of the wheel P, which being instantly released and permitted to feed forward one tooth by the spacing-dogs O O', carries the hammer-lever by means of the dog V, back to the first position and thus sets the hammer for the following stroke. It will be understood that the spring W is only strong enough to make the blow and not strong enough to resist the action of the coiled spring in the wheel P.

Figure 10:
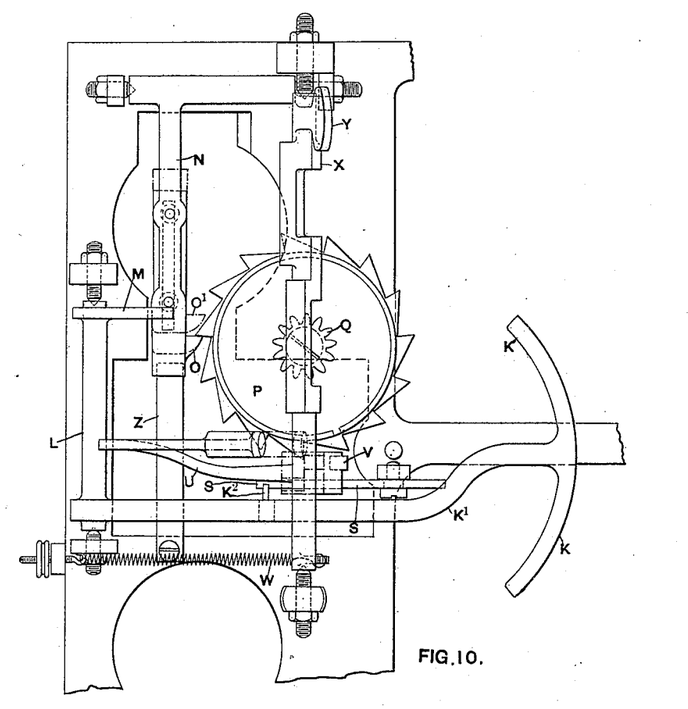
Fig. 10 is a partial plan showing the impression-hammer.

The hammer or ram is shaped so as to clear the paper-carriage, and it is faced with a comparatively soft material, such as india-rubber or cork. It is connected to the rocking bar X, which is cranked, as shown in Fig. 10, to clear the framing and the rack-pinion. To this bar there is also connected the release-key Y. When it is desired to feed the paper-carriage back by hand, the release-key is pressed forward, whereupon the hammer-lever comes into contact with the spring Z (which holds the lever N up with the spacing-dogs in gear with the teeth of the wheel P) and pressing it downward permits the dogs to come out of gear and leaves the escape-wheel, and consequently, also, the rack-pinion, free to rotate with the motion of the carriage.

Figure 15:
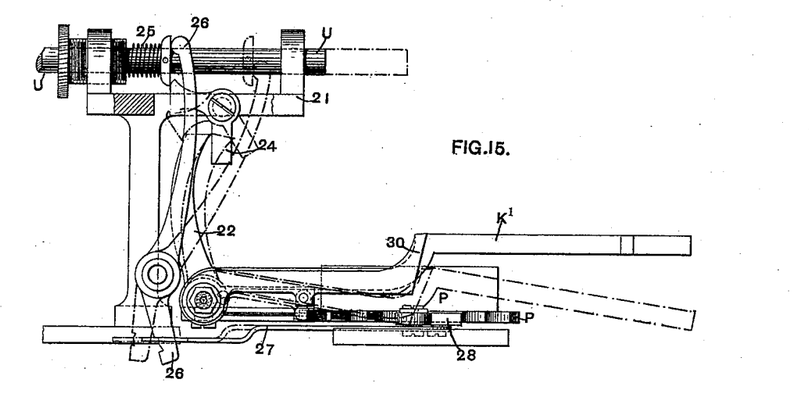
Figure 16:
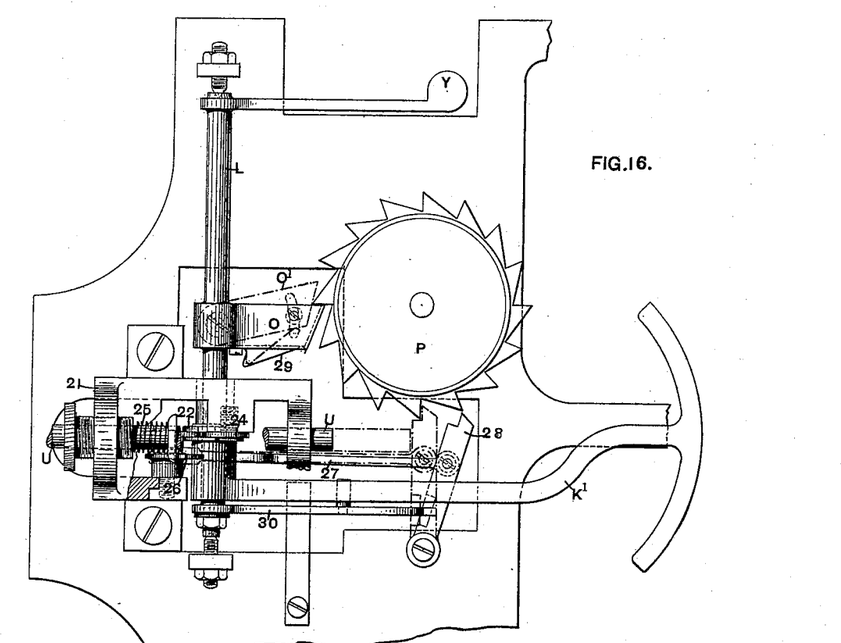

Instead of constructing and operating the impression-hammer, as hereinbefore described, the construction represented in Fig. 4ª or that shown in Figs. 15 and 16 may be employed.

In Fig. 4ª, U is the hammer or ram working in bearings in the bracket 21. On the ram-spindle there is a coiled spring 25, which forces the ram forward when liberated to make the impression. In front of the coiled spring there is a ring or projection on the ram with which the tip of an arm 22 of the lever K' normally engages. On the ram-spindle there is also a projection engaged by the trigger 24, which is held in contact with the projection by the light spiral spring connected to the bracket. The tip of the arm 22 carries a pin which, on the depression of the lever K', comes into contact with the trigger 24 and liberates it. The ram being then free is forced forward by the spring 25 and makes the impression. The ram is reset by the tip of the arm 22 being again brought into contact with its projection on the release of the lever K' by means of the spring 23, which is of greater strength than the spring 25 and restores the ram to its first position.

In the arrangement represented in Figs. 15 and 16 the shaft L, upon which the lever K is fulcrumed, carries an arm 22, the upper end of which is normally in contact with the vertical limb of the trigger 24. The end of the horizontal arm of this trigger engages with the ring or projection of the ram U just in front of the spiral spring 25, so as to normally hold the ram in the position shown in full lines. When, therefore, the lever K' is depressed the trigger is moved into the position indicated in dotted lines, Fig. 15, and the ram is released to make the impression. The resetting-lever 26 is pivoted on a stud below which the link 27 is connected to it. This link is also connected with the dog 28, which engages with the teeth of the wheel P. After an impression has been made the wheel P rotates, as hereinbefore described, through the space of one tooth, and in doing so carries forward the dog into the position shown in full lines in Fig. 16. The motion of the dog is communicated through the link 27 to the arm or resetting-lever 26, which thereby restores the ram to its normal or first position.

The arrangement of the feeding-dogs O and O' is slightly different to that shown in Figs. 9, 10, 11, and 12. The dog O is fixed to the shaft L and the dog O' is pivoted just below so as to be capable of moving into the position indicated by the dotted lines. Normally the dog O is in the position shown by the dotted line and it may be provided with a curved slot to limit this motion by a pin passing through the slot and fixed in the dog O. The light spring 29 is employed to restore the dog O' to its former position after the feed has taken place. The action of the dogs in connection with the wheel P is precisely the same as hereinbefore described with reference to Figs. 9, 10, 11, and 12. The release-key Y is fixed upon the shaft L so that by depressing this key the dogs O O' are removed entirely out of engagement with the wheel P. The dog 28 is at the same time moved out of contact with the teeth of the wheel P by means of the lever 30, fulcrumed on the shaft L, and having its end formed to an eccentric curve so that the downward motion of the lever 30 pushes the dog 28 out of gear and into the position shown in full lines, Fig. 16. When the dogs are out of gear with the teeth of the wheel the paper carriage may be freely moved into any desired position.

Figure 8:
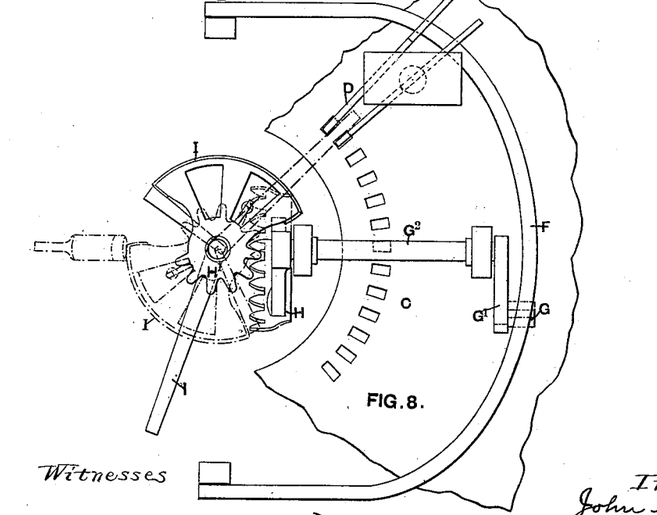
Fig. 8, a plan of the devices for rotating and locking the type-cylinder.

All the second limbs or extensions of the type-key stems pass through the plate C in the arc of a circle, as shown in Fig. 8. This arc is swept through immediately below the plate C and the bottoms of the stems D by a finger 1 fixed upon the type-cylinder spindle. When a type-key is depressed the finger is moved through the arc until it comes into contact with the depressed limb or stem D, where and by which it is stopped. This arrangement insures the absolute precision of position of the type-cylinder for printing the required character. As represented in dotted lines in the figure the finger 1 has moved into contact with the end key-stem and the type-cylinder has moved so as to present one of the characters in the outside vertical row and the hammer-head has moved forward to make the blows which cause the impression.

Figure 5:
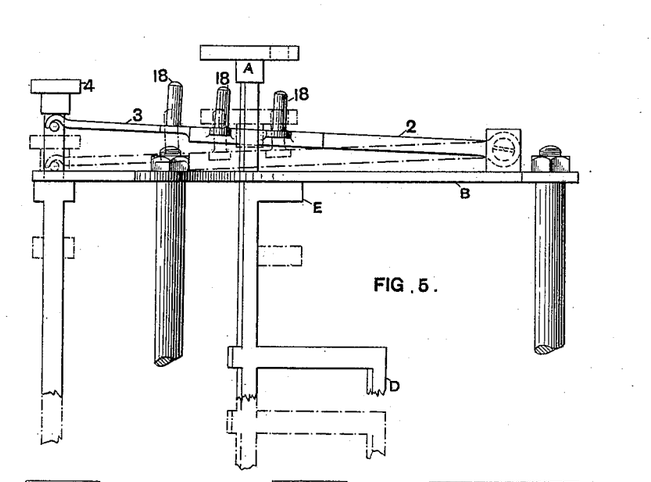
Fig. 5, an elevation of the operating keyboard.
Figure 7:
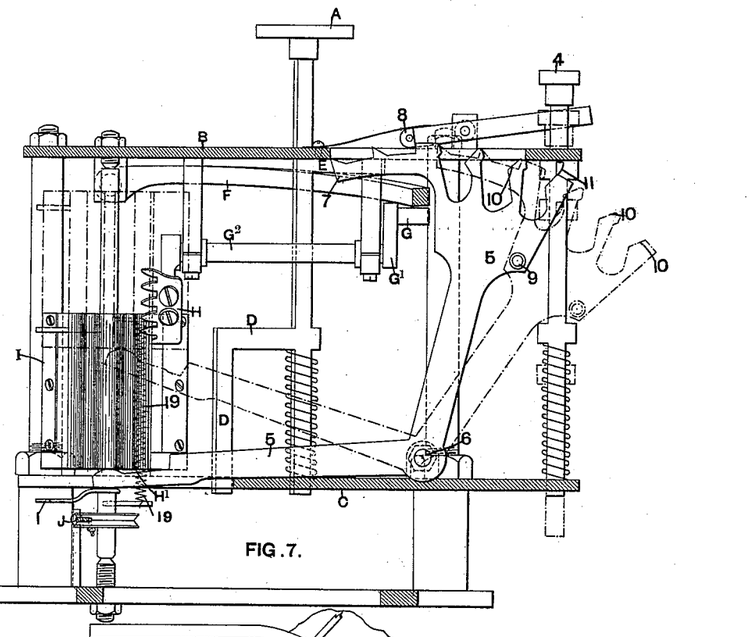
Fig. 7, a partial longitudinal section of the machine, showing a different arrangement of the shift-key from that represented in Figs. 5 and 6.

The shift-key, by means of which the second row of characters in any field is brought into the printing-plane, may be constructed as shown in Figs. 1, 5, and 7, or as shown in Figs. 5 and 7 only. The simpler construction is that represented in Fig. 1, also in Figs. 5 and 7. Taking one field of characters only, the A E I O U Y T H R N D W B are in the upper row on the type-cylinder, and the characters J Q P K X Z S G V M F L C are in the lower row. Of course any other convenient arrangement of letters may be adopted. When it is desired to print the A E D W or any letter in the upper row, the type-key is simply struck or depressed. When it is desired to print the J X G or any letter in the second row, the shift-key is depressed simultaneously with the type-key. This may easily be done by using the thumb (or another finger) to depress the shift-key while the type-key is being struck. If it is desired to construct the machine in such a manner that a single stroke with one finger will print a character in either the upper or the lower row of the field, I arrange a lever 2 below the type-keys on which projections 18 are formed in such positions and of such a form that they will enter holes or slots in the keys or similarly approach them, Figs. 5 and 6. The lever 2 is connected by a rigid light rod 3 with the shift-key 4, so that when the lever 2 is depressed sufficiently the shift-key also will be operated. With this arrangement, when it is desired to print the S J Q V or any letter in the second row of the type-field, the finger is struck on that part of the key in which the hole or slot is formed, or so that the end of the finger comes into contact with the corresponding projection 18 on the lever 2 and depresses that lever with the type-key and also consequently depresses the shift-key.

As the shift-key operates through the lifting motion, I will describe them together with reference to Figs. 5, 6, and 7. A bell-crank lever 5, pivoted at 6, has its rounded back end under the type-cylinder, so that when this part of the lever is raised the type-cylinder will be lifted also. The front upper end of the lever has three notches cut therein, or as many notches as there are fields of type. On an extension 7 of the lever projections corresponding to the notches are formed, and above these is a detent 8, normally pressed into engagement with one of the projections, so as to lock the lever in any one position. On the front part of the lever 5 there is fixed a light handle 9, by means of which the lever may be moved backward and forward. The upper part of each of the notches is formed to an inclined plane, as at 10, Fig. 7. On the stem of the shift-key there is formed or secured a pin 11, which normally is at the summit of one of the inclined planes. On depressing the shift-key the pin 11 will come into contact with the inclined plane and traveling down it will move the lever 5 through a small angle which just suffices to lift the type-cylinder through the distance between the rows of characters of the type-cylinder, and consequently brings the second row of the field into the printing-plane. When the upper field is required for printing, the lever 5 is in the position represented in full lines in Fig. 7. When the second field is required, the lever is pulled forward by the handle until the second inclined plane is under the pin 11, and when the third or lower field is required the lever is drawn forward until the third notch is under the pin 11 or in the position occupied in the dotted lines in the figure. In the second and third positions the lever is locked by the detent 8, and in either of the positions one of the inclined planes will be presented to the pin 11. A slight touch of the finger on the detent 8 will release the lever, when the weight of the type-cylinder, re-enforced by a spring 19, will at once restore it to the first position.

The type-key and the shift-key stems are provided with light coiled springs to restore them to their original positions after they have been operated.

The paper-roller is provided with clips or paper-guides, and it is also provided with a strip of metal or vulcanite or similar material 14 in front of the roller, which acts as a guide. This strip is preferably caused to approach closely to the paper-roller at the point where the paper enters, as shown in Fig. 4ᵃ.

Figure 17:
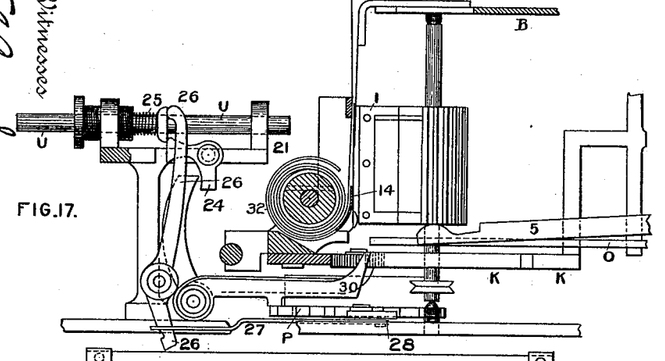
Fig. 17 is a transverse section of the paper-carriage with the contiguous parts of the machine in elevation.
Figure 18:
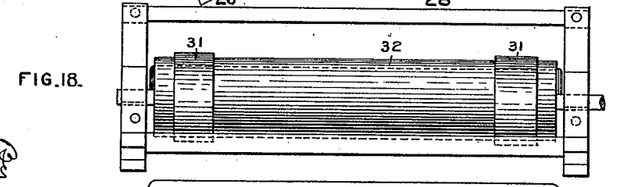
Fig. 18 is a plan of the paper-carriage.
Figure 19:
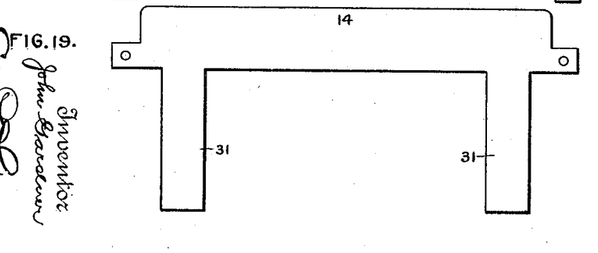
Fig. 19 is a plan of the paper-guide flattened out.

The paper-guide 14 consists of a plate of thin sheet metal or other suitable material—such as vulcanite—cut to the form indicated in Fig. 19. This plate is bent to a curvature having a rather larger radius than that of the paper-roller 32, so as to permit the paper to be coiled between the roller and the guide, as shown in Fig. 17. The plate may be solid, so as to extend nearly around the paper-roller; but it is preferred, in order to reduce the weight, to cut away the central back portion, leaving the two wings 31, which act effectually as guides.

In using the machine the paper is entirely wound upon the roller which is rotated by the handle 12. The top edge of the paper having been brought into alignment with the top edge of the guide 14, the roller is turned so as to unwind the paper until it is in the correct position for printing. There may be a ratchet-wheel 15 and a detent 16, the ratchet-wheel being mounted on the paper-cylinder shaft. In spacing between the lines the operator will turn the handle, when the detent will make a number of audible clicks, and if the operator makes the same number of clicks each time the spacing between the lines will be equal.

The inking pad or brush 17 is mounted on a strip of metal, which fits into grooves in the plates B B C, so that it may be readily removed to be recharged or cleaned.

Figure 20:
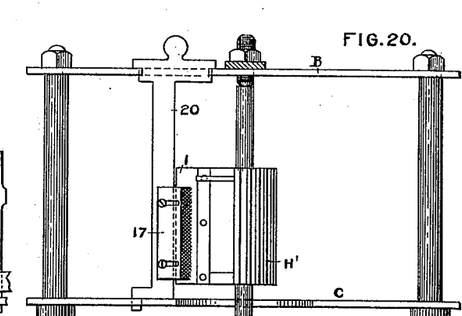
Figure 21:
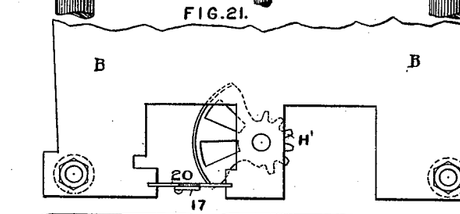
Fig. 21 is a plan, of part of the machine, showing the construction and arrangement of the inking-pad.
Figure 22:
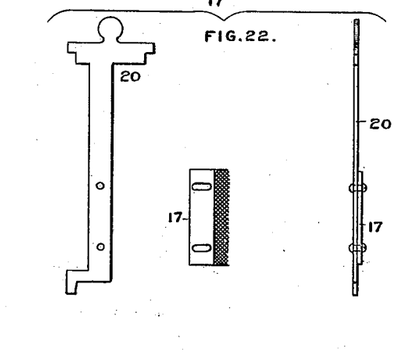
Fig. 22 shows in elevation the inking-pad and the standard to which it is attached, and a side view of the inking-pad attached to the standard 20.

The printing-characters are continuously inked by their to-and-fro motion in contact with the inking pad or brush 17. The inking-pad 17 consists of a strip of felt or other suitable material secured to a strip of metal in which horizontal slots are formed, as shown in Fig. 22, and it is secured to the standard 20 by means of screws passing through the slots which permit horizontal adjustment nearer to or farther from the type-segment. The standard 20 is attached to the machine by passing its upper member into two slots formed within a recess in the upper plate B of the machine, while at the same time the foot or a projection from the foot of the standard passes within a slot formed in the lower plate of the machine, Figs. 20 and 21. Since the inking-pad is considerably longer by preference than the depth of the printing-field, no vertical adjustment is necessary. The position of the pad is such that it stands normally in advance of the first tier of type on the segment, so that the first movement of the type segment or cylinder carries the type into contact with the inking-pad, and they are thus brought to their printing position freshly inked. Since the type cylinder or segment returns to its normal position after a type-key is struck and released and before the next key is depressed, it follows that some or all of the type are freshly inked at each actuation of the type-key, always including those about to be used.

In an application filed March 16, 1891, Serial No. 385,323, I have shown, described, and claimed certain modified constructions of and additions to the mechanism forming the subject-matter of this present application. These modifications relate to the arrangement of the arc-lever, the actuation of the stop-finger, the substitution of a type-cylinder for a type-segment, the construction of the type-shield, the shape of the key-stems, the dispensing with the separate spacing-key, and the arrangement of the feed-dogs. Such subject-matter as is common to both machines is claimed herein.

Having now particularly described and ascertained the nature of my said invention and in what manner the same is to be performed, I declare that what I claim is—

1. In a type-writing machine, the combination, with an axially-movable type-cylinder having a long segmental pinion, of a rock-shaft at right angles with the axis of the type-cylinder, a segment crown-gear engaging with the pinion and secured to one end of the rock-shaft, a wrist-pin at the other end of the shaft, a stepped or diagonal lever arranged to bear upon and move the wrist-pin, and a series of type-keys adapted to actuate the lever, substantially as described.

2. The combination, with a series of type-keys A, of a diagonal or stepped U-shaped lever F, adapted to be operated by any one of said keys, a rock-shaft $G^2$, transverse to the axis of the lever F, a wrist-pin G, located at one end of said shaft and in contact with the lever F, a toothed segment H, connected with the other end of the shaft, and a type-cylinder having the pinion H' in mesh with the toothed segment, substantially as described.

3. The combination, with the vertically-reciprocating type-keys A, having the legs D and arms E, of the U-shaped lever F, underlying the arms E, the rock-shaft carrying the wrist-pin and the toothed segment, the type-cylinder having the pinion, and the sweep I, moving with the cylinder and adapted to strike the leg D when a key is depressed, substantially as described.

4. In a type-writing machine, the combination, with an axially-movable type-cylinder, of a lifting-lever operating independently of the type-keys and having a series of angular projections, and a detent or locking device for engaging with said projections to hold the cylinder in its raised position while the type-keys are being used, substantially as described.

5. The combination, with an axially-movable type-cylinder, of a lifting-lever having a series of inclined planes and a shifting-key adapted to engage with either of said inclines and actuate the lever, substantially as described.

6. The combination, with an axially-movable type-cylinder, of a lifting-lever having a series of notches, each formed with an inclined plane, and a reciprocating shifting-key having a pin adapted to engage with one or the other of said inclines, substantially as described.

7. The combination, with an axially-movable type-cylinder, of a lifting-lever having a series of projections and a series of inclined notches corresponding therewith, a detent to engage with the projections, and a shift-key adapted to engage with the inclines, substantially as described.

8. The combination, with the type-cylinder I, of the bent lifting-lever 5, having the extension 7, provided with projections, the notches provided with the inclined planes 10, the shift-key 4, having the pin 11, adapted to engage with the inclines, and the detent 8, substantially as described.

9. The combination, with the type-key A, having a hole therein, of the lever 2, having the projection 18, adapted to enter the hole in the type-key, and the key 4, adapted to be moved by the lever 2, substantially as described.

10. The combination, with the spring-actuated hammer U, of the trigger 24, holding it when set, a rock-arm 22 for tripping the trigger to release the hammer, a lever K', adapted to actuate the rock-arm, a resetting-lever 26, a link 27, connecting said lever with a dog 28, a ratchet-wheel P, adapted to engage with the dog to reset the hammer, and feeding-dogs engaging with the wheel and operated by the movement of the lever K', substantially as described.

11. The combination, with the shaft L, of the lever K', fulcrumed thereon, the fast and loose feed-dogs secured thereto, the arm 30, fast on the shaft and having a lateral projection underlying the lever K', the arm 22 on the shaft L, the hammer U, actuated by the spring 25, and the trigger 24, engaging with a collar on the hammer and adapted to be moved by the arm 22 to release the hammer, substantially as described.

12. In a type-writing machine, the combination, with a lever depressed by the type-keys, of a shaft upon which the lever is fulcrumed, a fast and a loose dog carried on the shaft, a feed-wheel with which said dogs engage, and a release-key fixed upon the shaft, substantially as described.

13. In a type-writing machine, the inking-pad 17, removably secured to the standard 20, the latter being adapted to be removably inserted into the frame of the machine, substantially as described.

In testimony that I claim the foregoing as my invention I have signed my name, in presence of two witnesses, this 10th day of February, 1890.

JOHN GARDNER.

Witnesses:
WM. E. WEYS,
J. W. ROWE.